US007359765B2

(12) United States Patent
Varvarelis et al.

(10) Patent No.: US 7,359,765 B2
(45) Date of Patent: Apr. 15, 2008

(54) ELECTRONIC PILL DISPENSER

(76) Inventors: Nicholas M. Varvarelis, 3501 Conshokocken Ave., Philadelphia, PA (US) 19131; Joshua Samuelson, 126 Crum Creek Dr., Woodlyn, PA (US) 19094

( * ) Notice: Subject to any disclaimer, the term of this patent is extended or adjusted under 35 U.S.C. 154(b) by 248 days.

(21) Appl. No.: 11/225,193

(22) Filed: Sep. 14, 2005

(65) Prior Publication Data

US 2006/0071011 A1 Apr. 6, 2006

Related U.S. Application Data

(60) Provisional application No. 60/609,875, filed on Sep. 15, 2004.

(51) Int. Cl.
*G06F 17/00* (2006.01)

(52) U.S. Cl. ...................... 700/237; 700/236; 700/240; 221/265; 221/277

(58) Field of Classification Search ................ 700/237, 700/240; 221/265, 277
See application file for complete search history.

(56) References Cited

U.S. PATENT DOCUMENTS

| | | | | |
|---|---|---|---|---|
| 4,273,254 | A * | 6/1981 | Cuppleditch et al. | 221/196 |
| 4,504,153 | A | 3/1985 | Schollmeyer et al. | |
| 4,573,606 | A | 3/1986 | Lewis et al. | |
| 4,733,797 | A | 3/1988 | Haber | |
| 5,213,232 | A | 5/1993 | Kraft et al. | |
| 5,347,453 | A | 9/1994 | Maestre | |
| 5,495,961 | A | 3/1996 | Maestre | |
| 5,582,323 | A | 12/1996 | Kurtenbach | |
| 5,713,485 | A * | 2/1998 | Liff et al. | 700/237 |
| 5,812,064 | A | 9/1998 | Barbour | |
| 5,852,590 | A | 12/1998 | De la Huerga | |
| 5,860,563 | A | 1/1999 | Guerra et al. | |
| 6,004,020 | A | 12/1999 | Bartur | |
| 6,021,918 | A | 2/2000 | Dumont et al. | |
| 6,194,995 | B1 * | 2/2001 | Gates | 340/309.7 |
| 6,237,804 | B1 | 5/2001 | Peery et al. | |
| 6,249,717 | B1 | 6/2001 | Nicholson et al. | |
| 6,259,654 | B1 * | 7/2001 | de la Huerga | 368/10 |
| 6,330,957 | B1 | 12/2001 | Bell-Greenstreet | |
| 6,497,342 | B2 * | 12/2002 | Zhang et al. | 221/265 |
| 6,581,797 | B2 | 6/2003 | McKinney, Jr. et al. | |
| 6,622,887 | B1 | 9/2003 | Roediger | |
| 6,633,796 | B1 | 10/2003 | Pool et al. | |
| 7,048,141 | B2 * | 5/2006 | Abdulhay et al. | 221/3 |
| 2002/0047019 | A1 | 4/2002 | Devers | |
| 2003/0183642 | A1 | 10/2003 | Kempker, Sr. | |
| 2003/0222090 | A1 | 12/2003 | Abdulhay et al. | |

* cited by examiner

*Primary Examiner*—Gene O. Crawford
*Assistant Examiner*—Timothy R Waggoner
(74) *Attorney, Agent, or Firm*—Richard C. Litman

(57) ABSTRACT

An electronic pill dispenser includes a container and a cap removably attached to the container. Components of the pill dispenser include a power source, pill dispenser circuitry, a real time clock, a counter, a display, a dispensing mechanism, a sensor, a visual indicator, an audible indicator, an input/output interface, an input output port, and a communication bus electrically interconnecting the components. The pill dispenser may also include a physical indicator, a locking mechanism, a transceiver, an antenna, and a modem. The pill dispenser enhances patient compliance for following through a particular drug regimen by offsetting negative effects of memory loss and other cognitive dysfunctions, attenuation of special senses, poor eyesight, lack of patient education, etc. The pill dispenser also helps the mentally unstable. The pill dispenser reminds users and dispenses pills to authorized individuals at appropriate times, and is economical and convenient.

12 Claims, 5 Drawing Sheets

ELECTRONIC PILL DISPENSER

CROSS-REFERENCE TO RELATED APPLICATION

This application claims the benefit of U.S. Provisional Patent Application Ser. No. 60/609,875, filed Sep. 15, 2004.

BACKGROUND OF THE INVENTION

1. Field of the Invention

The present invention generally relates to pill dispensers and, more particularly, to an electronic pill dispenser configured to remind and dispense medications to authorized individuals at appropriate times.

2. Description of the Related Art

Medications in the forms of pills, capsules, gel-caps, pellets, tablets, etc., are normally provided in the form of a disposable plastic container with a childproof cap. When physicians prescribe medications, they typically advise the patients of proper precautions to follow during the medication administration, such as storing the medications correctly to optimally preserve them, to take the medications at appropriate times and quantities, to continue taking the medications for the full prescribed regimen, even if the patient feels better, etc. Unfortunately, patients frequently exhibit poor patient compliance in properly following through a particular drug regimen. Some factors associated with poor compliance include memory loss and other cognitive dysfunctions, poor patient motivation, attenuation of special senses, poor eyesight, lack of patient education, etc.

A variety of products and techniques for reminding patients during medication regimens are known, and are generally cost prohibitive. Therefore, a need exists for an electronic pill dispenser that is configured to remind and dispense medications to authorized individuals at appropriate times and that is economical and convenient. In addition, a particular need exists for an electronic pill dispenser configured to remind and dispense pills, capsules, pellets, tablets, or the like having any particular size and shape.

The related art is represented by the following references of interest.

U.S. patent application Publication No. 2002/0047019, published Apr. 25, 2002 and applied for James Devers, describes an electronic pill dispenser that includes two receptacles, one of which is easily accessible, and is programmed as to when respective medications should be dispensed. U.S. patent application Publication No. 2003/0222090, published Dec. 4, 2003 and applied for Gazi Abdulhay et al., describes an automated personal pill dispenser to manage dispensing of medications for a given person, in a partly automated manner so as to benefit from the use of a processor to at least alert the user and to feed selected doses from supplies of multiple drugs. U.S. Pat. No. 4,504,153, issued Mar. 12, 1985 to Thomas A. Schollmeyer et al., describes a pharmacist-programmable medication prompting system that includes a programmable prompting device that is attached to a medication container and is automatically programmed in response to inputting of a physicians prescription instructions to cause the prompting device to automatically prompt a patient to take medication at prescribed times.

U.S. Pat. No. 4,573,606, issued Mar. 4, 1986 to Kermit E. Lewis et al., describes an automatic pill dispenser for dispensing medical pills having different prescribed administration schedules. U.S. Pat. No. 4,733,797, issued Mar. 29, 1988 to Terry M. Haber, describes a dosage sealing, monitoring, and dispensing assembly including removable cartridges from which a daily dosage of vitamins, medicines, or the like, can be automatically dispensed to a user over a predetermined length of time. U.S. Pat. No. 5,213,232, issued May 25, 1993 to Thomas L. Kraft et al., describes an apparatus for dispensing homogeneous units one at a time upon rotation of the dispensing apparatus. U.S. Pat. Nos. 5,347,453 and 5,495,961, issued Sep. 13, 1994 and Mar. 5, 1996, respectively, to Federico A. Maestre, describe a portable programmable medication alarm device for aiding in the administration of medication or pharmaceuticals in accordance with a prescribed medication dosage schedule.

U.S. Pat. No. 5,582,323, issued Dec. 10, 1996 to Larry O. Kurtenbach, describes a medication dispensing and monitoring system for dispensing medication to a patient at a desired time. U.S. Pat. No. 5,812,064, issued Sep. 22, 1998 to William P. Barbour, describes a medicine container with a sound capsule that aids those who are visually impaired to receive instructional information concerning the medicine. U.S. Pat. No. 5,852,590, issued Dec. 22, 1998 to Carlos de la Huerga, describes a multi-piece medication container having a first piece with an interactive label and memory strip containing prescription information, medication information and program codes that are downloaded to a second piece having a computer processor for communicating information to a patient and inputting or updating information in the memory strip.

U.S. Pat. No. 5,860,563, issued Jan. 19, 1999 to Lawrence E. Guerra et al., describes a medicine vial dispensing apparatus that receives open top, medicine vials from storage in a horizontal orientation and delivers the vials for use in a substantially upright orientation. U.S. Pat. No. 6,004,020, issued Dec. 21, 1999 to Meir Bartur, describes a medication dispensing and monitoring system that includes an acknowledge-back pager, a carriage communicating with the pager, and a medication unit dispensing stored medications. U.S. Pat. No. 6,021,918, issued Feb. 8, 2000 to Richard R. Dumont et al., describes a programmable dispenser in which the delivery of medication can be made in dosages and at times preset by the patient or caregiver.

U.S. Pat. No. 6,237,804, issued May 29, 2001 to Van Collin Peery et al., describes a pill dispensing apparatus that is capable of discharging various quantities of pills in an orderly and controllable manner. U.S. Pat. No. 6,249,717, issued Jun. 19, 2001 to Laurence R. Nicholson et al., describes a liquid medication dispenser apparatus that provides for user-friendly medication measurement and compliance. U.S. Pat. No. 6,330,957, issued Dec. 18, 2001 to Daryl L. Bell-Greenstreet, describes an automatic medication dispenser that is capable of distributing medication according to at least one prescribed time schedule. U.S. Pat. No. 6,581,797, issued Jun. 24, 2003 to Edward C. McKinney, Jr., et al., describes a programmable vitamin and pill dispenser that is capable of storing multiple pill groups.

U.S. Pat. No. 6,622,887, issued Sep. 23, 2003 to Larry Roediger, describes an automated medicine dispensing apparatus for dispensing an accurate amount of medication at a particular time of the day. U.S. Pat. No. 6,633,796, issued Oct. 14, 2003 to Dan B. Pool et al., describes a medication timing device for signaling medication consumption. Germany Patent Application Publication No. 19,521,912, published Dec. 19, 1996, describes a pill dispensing unit with several chambers which are filled with pills or other medications in a defined sequence, and are released in this sequence at defined times.

None of the above inventions and patents, taken either singly or in combination, is seen to describe the instant invention as claimed. Thus, an electronic pill dispenser solving the aforementioned problems is desired.

SUMMARY OF THE INVENTION

The present invention is an electronic pill dispenser. The electronic pill dispenser includes a container and a cap removably attached to the container. Components of the pill dispenser include a power source, pill dispenser circuitry, a real time clock, a counter, a display, a dispensing mechanism, a sensor, a visual indicator, an audible indicator, an input/output interface, an input output port, and a communication bus electrically interconnecting the components. The pill dispenser may also include a physical indicator, a locking mechanism, a transceiver, an antenna, and a modem.

The pill dispenser enhances patient compliance for following through a particular drug regimen by offsetting negative effects of memory loss and other cognitive dysfunctions, attenuation of special senses, poor eyesight, lack of patient education, etc. The pill dispenser prevents premeditated, accidental, psychotic, and/or accidental episodes of overdose to mentally unstable patients. The pill dispenser reminds users and dispenses pills to authorized individuals at appropriate times, and is economical and convenient. The pill dispenser also reminds users and dispenses pills, capsules, pellets, tablets, or the like having any particular size and shape.

Accordingly, it is a principal aspect of the invention to provide an electronic pill dispenser electronic pill dispenser includes a container and a cap removably attached to the container. Components of the pill dispenser include a power source, pill dispenser circuitry, a real time clock, a counter, a display, a dispensing mechanism, a sensor, a visual indicator, an audible indicator, an input/output interface, an input output port, and a communication bus electrically interconnecting the components. The pill dispenser may also include a physical indicator, a locking mechanism, a transceiver, an antenna, and a modem.

It is an aspect of the invention to provide improved elements and arrangements thereof in an electronic pill dispenser for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
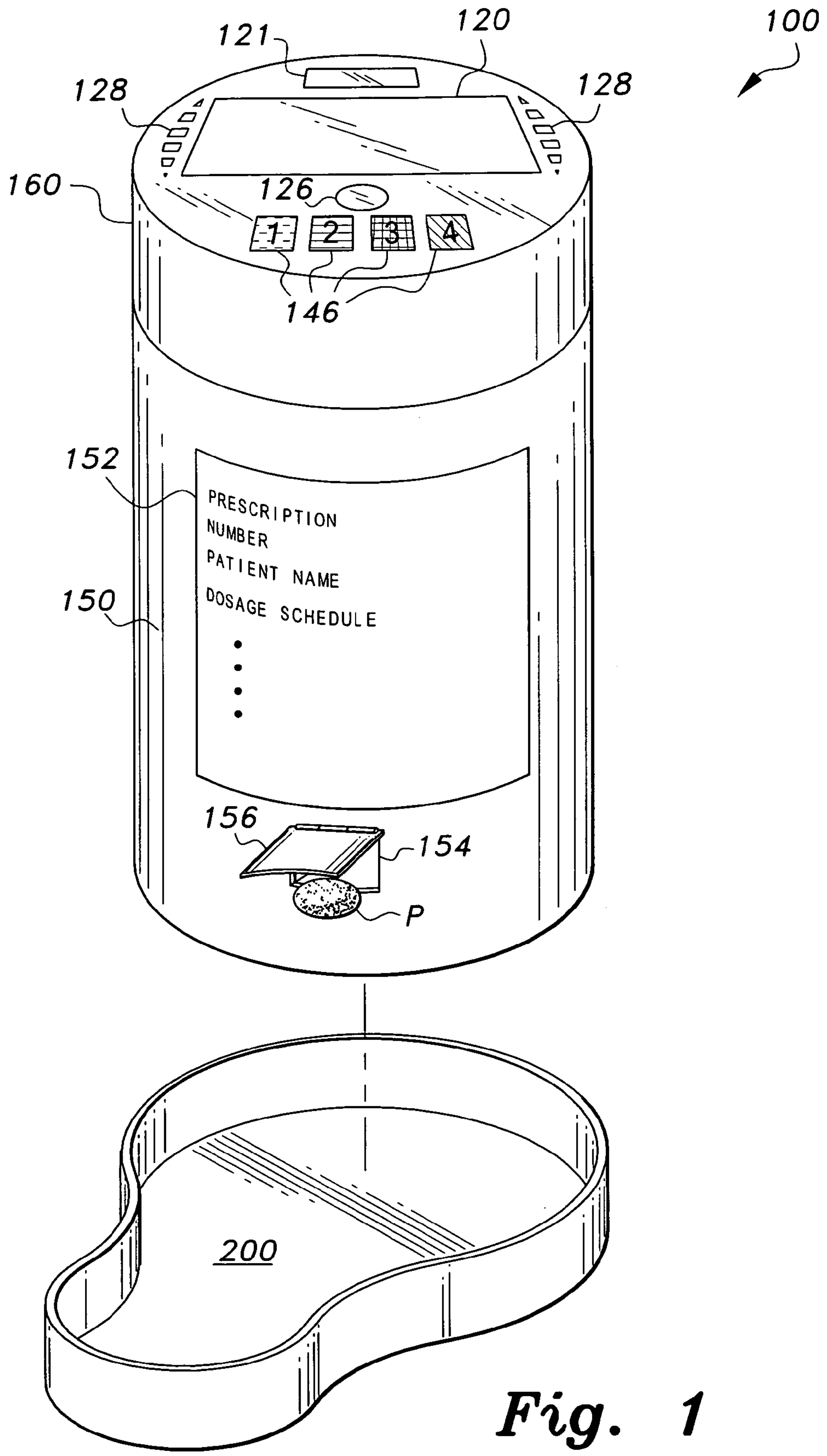
FIG. 1 is front perspective view of an electronic pill dispenser and a pill dispenser accessory tray according to the present invention.

The present invention is an electronic pill dispenser. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 3:
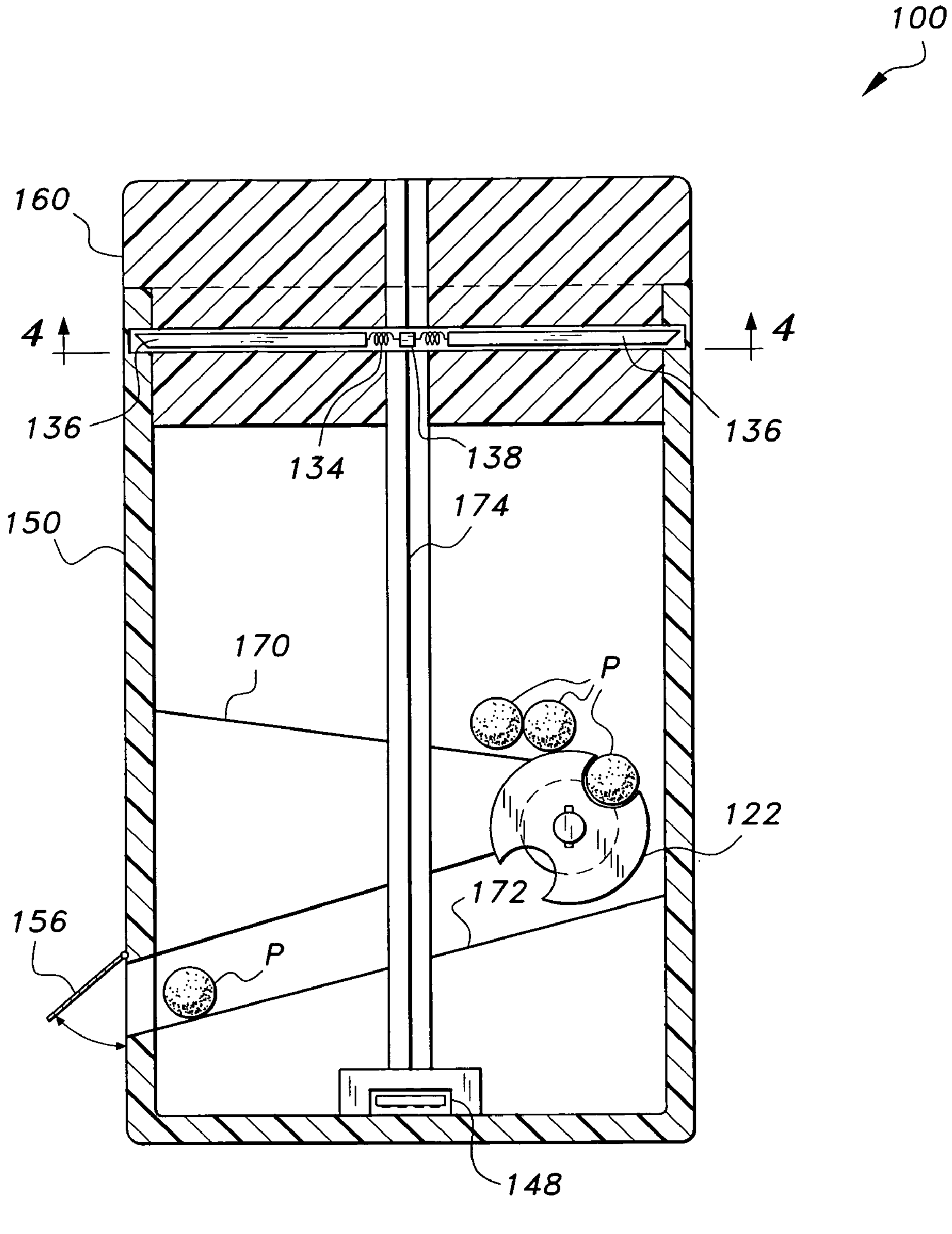
FIG. 3 is a cross-sectional side view of the electronic pill dispenser shown in FIG. 1.
Figure 4:
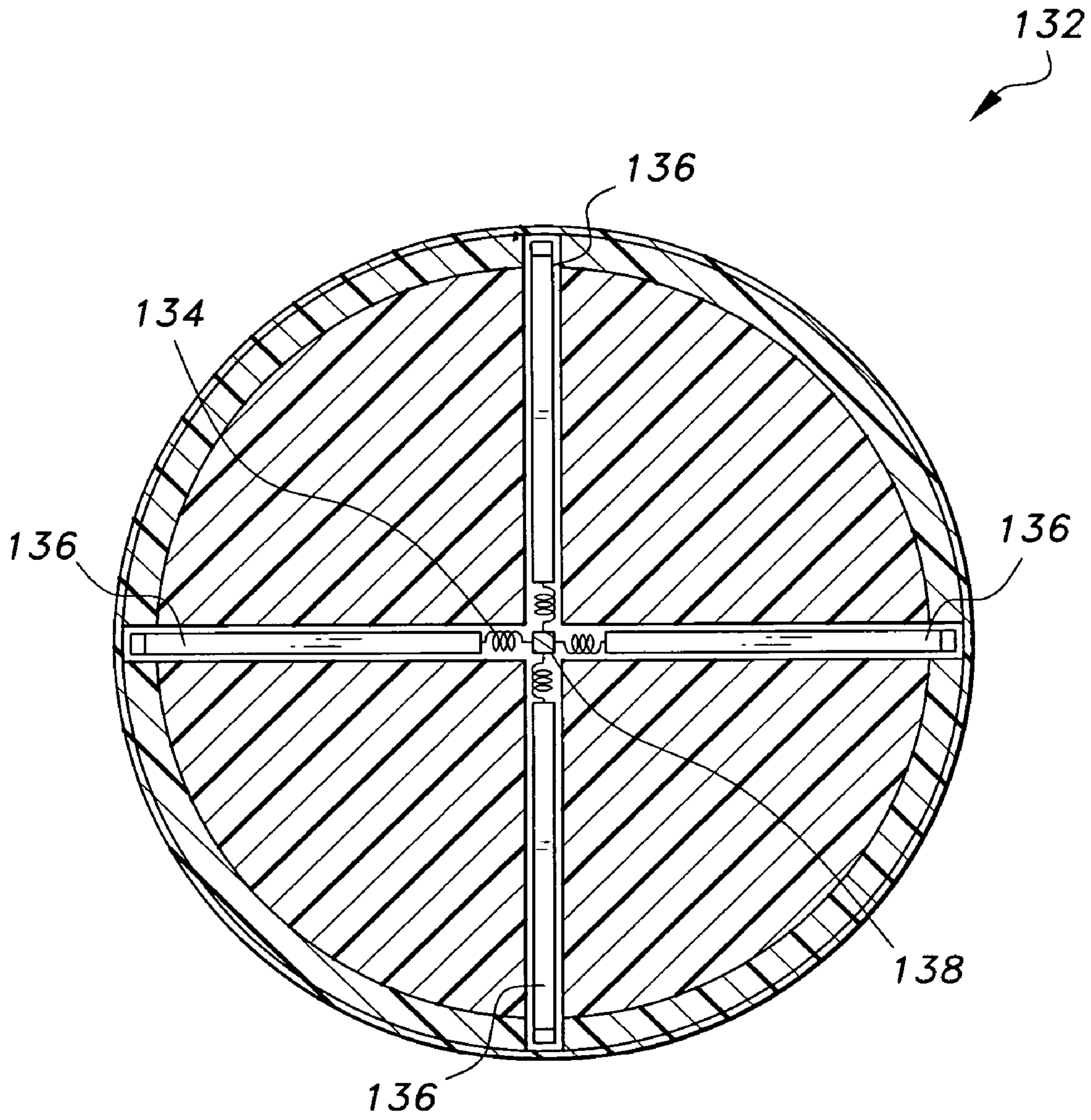
FIG. 4 is a cross-sectional side view of the electronic pill dispenser cap shown in FIG. 3.
Figure 5:
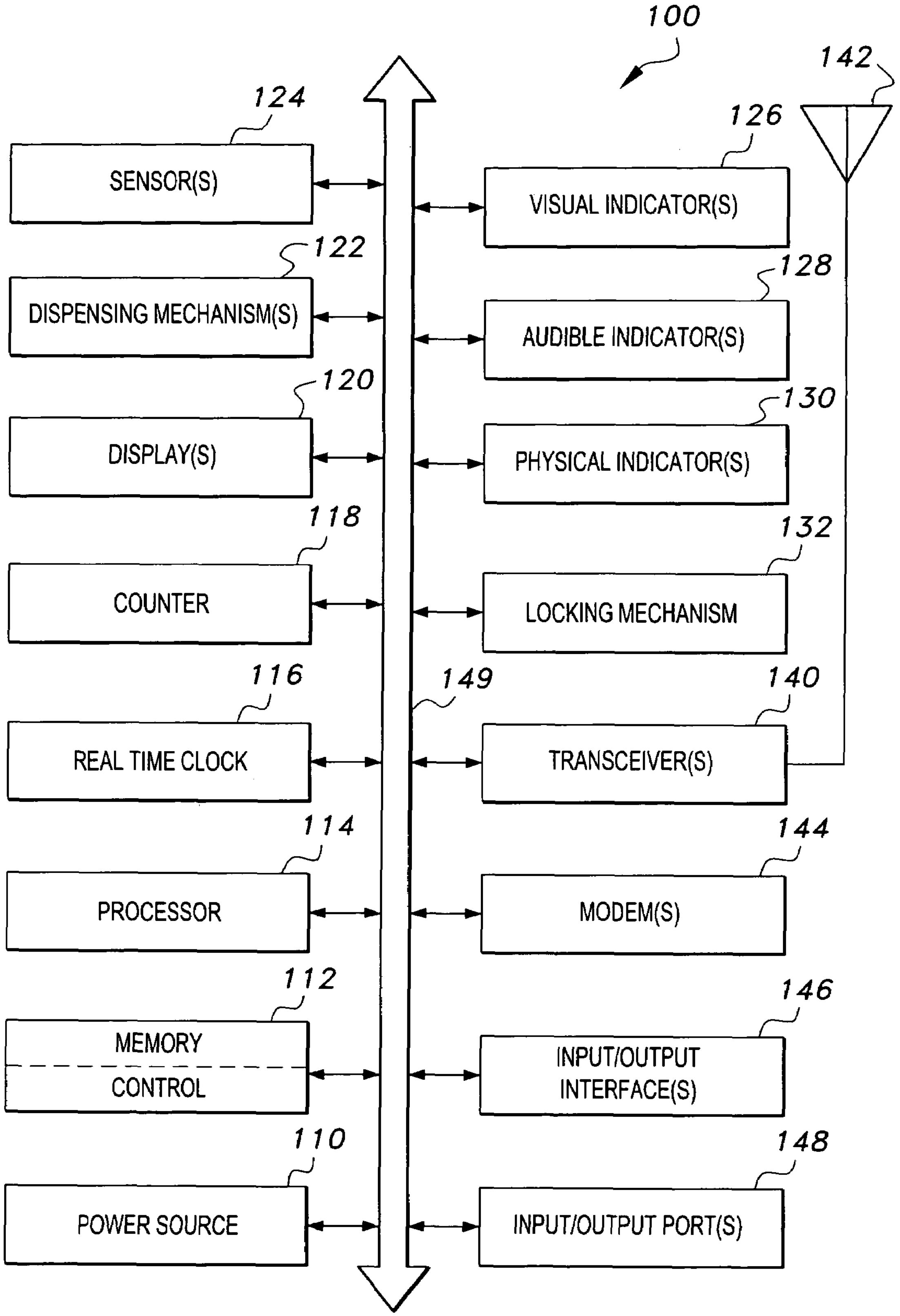
FIG. 5 is a block diagram of the electronic pill dispenser shown in FIG. 1.

Referring to the drawings, FIGS. 1-5 show an electronic pill dispenser 100 according to the present invention. The pill dispenser 100 is configured to dispense pills P, where the term “pill”, as used herein, refers to any capsules, gel-caps, pellets, tablets, or the like, in any particular size or shape, and the “size” as used herein, refers to any measurement and/or dimension of the pill P, and includes but is not limited to the maximum width and/or length of the same. As shown in FIG. 5, the pill dispenser 100 has components which may include a power source 110, memory 112 with control software embodied therein, a processor 114, a real time clock 116, a counter 118, one or more displays 120, one or more dispensing mechanisms 122, one or more sensors 124, one or more visual indicators 126, one or more audible indicators 128, one or more physical indicators 130, a locking mechanism 132, one or more transceivers 140, an antenna 142, one or more modems 140, one or more input/output interfaces 146, one or more input output ports 148, and a communication bus 149 electrically interconnecting the components.

Referring to FIG. 1, the pill dispenser 100 has a container 150 and a removable cap 160. The container 150 is formed as a receptacle for storing and dispensing any size of pill P, is preferably made from durable material, such as flexible plastic, rubber, or the like, and while the container 150 is illustrated as a cylindrical container, similar to a conventional cylindrical pill container, the container 150 may be configured in any shape as desired. The container 150 has an open top and a bottom. The container 150 may be clear, transparent, and/or translucent, or may be opaque and be provided with any type of color or combination of colors, or have decorative symbols or indicia provided thereon.

The container 150 is configured to attachably receive a prescription label 152 with prescription data imprinted thereon, such as a prescription number, a patient name, a dosage schedule, a medication name, an expiration date, an available refill quantity, a physician name, etc. The container 150 also has an opening 154 defined therein proximate the bottom of the container 150. A door or hatch 156 is pivotally mounted to open and close the opening 154 in accordance with predetermined criteria. The door or hatch 156 is preferably configured to be very user friendly to open to accommodate individuals who have difficult using their hands.

An optional pill-dispensing tray 200 is shown in FIG. 1 that is configured for being removably secured to the bottom of the pill dispenser 100. The pill-dispensing tray 200 provides a convenient way for pills P to be dispensed for individuals who may have trouble retrieving dispensed pills from the opening 154 via the door or hatch 156.

The cap 160 is preferably configured with the power source 110, the memory 112, the processor 114, the real time clock 116, the counter 118, the display(s) 120, the visual indicator(s) 126, the audible indicator(s) 128, the physical indicator(s) 130, the locking mechanism 132, transceiver(s) 140, the modem(s) 144, and the input/output interface(s) 146. The cap 160 is preferably made from durable material, such as flexible plastic, rubber, or the like, and is configured to be removably attached to the container 150 via internal threading or the like. The container 150 has an open top and a bottom. The cap 160 may be clear, transparent, and/or translucent, or may be opaque and be provided with any type of color or combination of colors, or have decorative symbols or indicia provided thereon.

The locking mechanism 132 is preferably configured to prevent unauthorized individuals from removing the cap 160 and emptying any pills P contained therein. As shown in FIG. 4, one configuration of the locking mechanism 132 includes a plurality of bias springs 134 interconnected between movable arms 136 and a solenoid 138. The movable arms 136 are configured to slidably move within paths or channels within the cap 160 and be positioned in a closed position where the arms 136 move into accommodating recesses in the sidewall of the container 150, and in an open position where the arms 136 are not in the recesses in the sidewall of the container 150. The solenoid 138 is communicatively interconnected to the processor 114 and can be configured to position the arms 136 in the closed position or the open position upon entry of an appropriate code into the processor, such as a personal identification code (PIN) for a pharmacist or the like.

Figure 2:
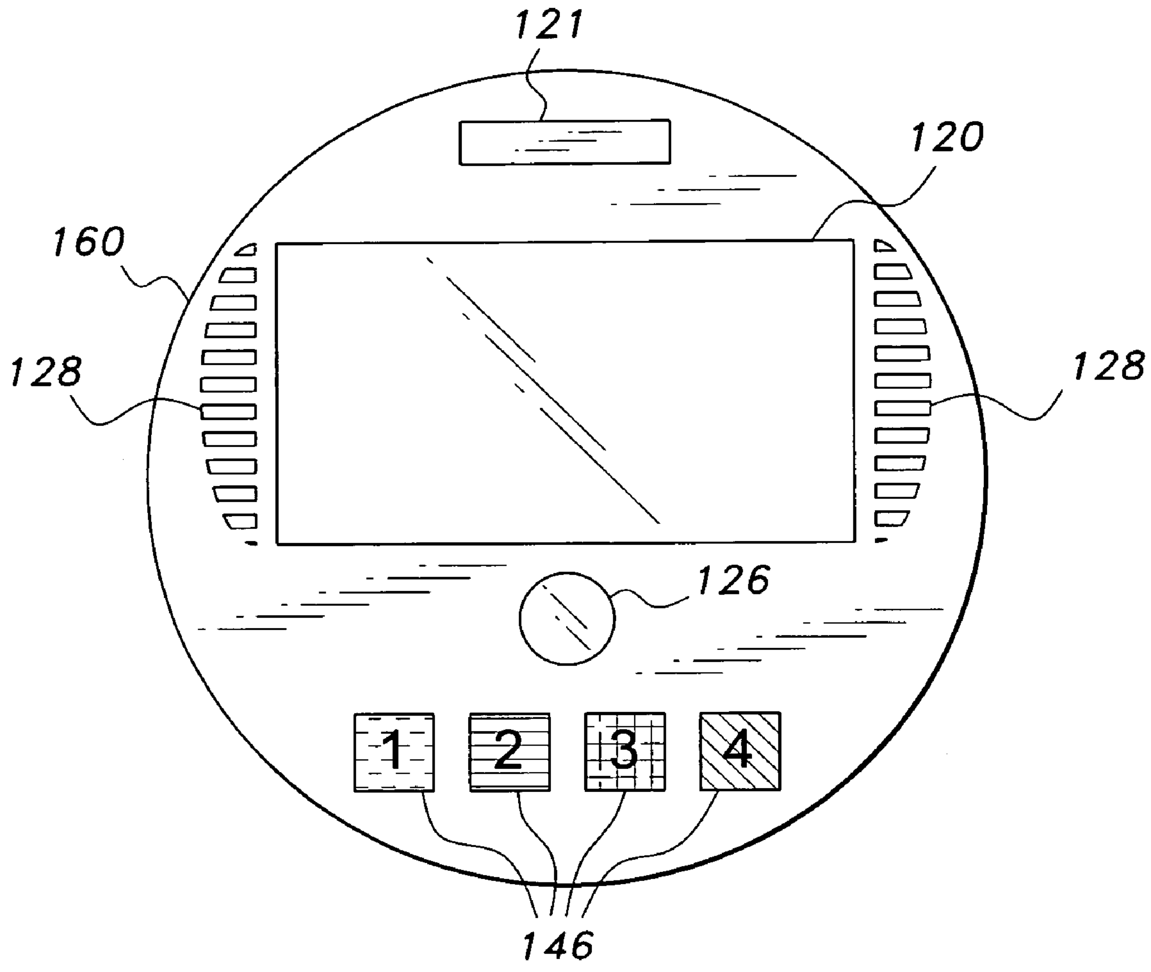
FIG. 2 is a top view of the electronic pill dispenser shown in FIG. 1.

Referring to FIG. 2, the cap 150 is illustrated with the display 120, a key or button 121 to illuminate the display 120, a visual indicator 126, an audible indicator 128, and input/output interfaces 146. The display 120 can indicate a low power source signal, a counter for pills taken, a counter for pills remaining, a time of last confirmed dosage, etc. The visual indicator 126 can flash in a desired color, e.g., red, green, etc., to indicate when it is time for a pill to be taken. The audible indicators 128 can emit an audible sound when it is time for the pill to be taken. The input/output interfaces 146 preferably comprise four keys, buttons, or toggle switches that may be color-coded and/or may include indicia to enable a user to enter a PIN to cause the pill dispenser 100 to dispense a pill P.

The power source 110 is preferably a thin lithium battery, but may be any suitable power source, such as one or more batteries (rechargeable or non-rechargeable) or the like, and may be removable or non-removable. The memory 112 and the processor 114 are configured in the form of a microcontroller, control logic, firmware, or other pill dispensing circuitry. The memory 112 stores instructions and data as processed information and includes some form of pill dispensing software embodied thereon. The memory may be configured on any type of volatile or non-volatile medium, such as Flash memory, EEPROM memory, dynamic RAM memory, parameter RAM memory, or the like.

The processor 114 connects to all of the components on the pill dispenser 100 and controls the movement and process of instructions as well as data in the dispenser 100. The memory 112 and processor 114 may be programmed internally by the input/output interface(s) 146 and/or externally wirelessly or non-wirelessly using a remote computer device via the transceiver(s) 140 and antenna 142 or through the input/output port(s) 148.

The real time clock 116 serves as a timing mechanism to provide timing data corresponding to particular occurrences associated with the sensor(s) 124. For example, when the dispensing mechanism dispenses a pill P, the associated sensor(s) 124 provide a signal of the dispensing activity, whereupon the processor 114 obtains timing data from the real time clock 116 and stores the timing data in the memory 112. The display is preferably configured as a liquid crystal display (LCD), but may be any type of electronic display as desired. The display(s) 120 are configured to be illuminated and one of the input/output interfaces, e.g., a button key, toggle switch, etc., may be configured to turn the display(s) 120 on and off. Alternatively, the display(s) 120 may be configured to provide appropriate intensity according to the level of available ambient light. The power source, memory 112, processor 114, real time clock 116, and display(s) 120 are preferably resident in the cap 160 of the pill dispenser 160 and are electrically connected to an insulated electrical conductor on the inside of the cap 160.

The pill dispenser 100 is configured to store and dispense a pill having a particular size through the opening 154 and through the door or hatch 156 of the dispenser container 150. As shown in FIG. 3, an upper ramp 170 and a lower ramp 172 are included inside the container 150. An insulated electrical conductor 174, e.g., a wire or the like, is also included as part of the pill dispenser 100, where a portion of the conductor 174 is preferably resident along the inside wall of the container 150, and a portion of the conductor 174 is preferably resident along the inside of the cap 160, so that the conductor 174 portions in the container and in the cap 160 electrically interconnect when the cap 160 is attached to the container 150. Disposed between the upper and lower ramps 170 and 172 is the dispensing mechanism 122. The dispensing mechanism 122 is preferably configured as a rotary wheel with an integral motor to rotate the rotary wheel. The rotary wheel includes two recesses diametrically opposed to each other, where the two recesses are each configured for a pill P having a particular size.

For example, when the container 150 is configured for use for a pill P having a predetermined size, a sample of the predetermined pill P may be placed in the container to engage the recesses of the dispensing mechanism 122. The dispensing mechanism 122 may or may not have adjustable recesses that may conform to the size of the predetermined pill P, e.g., through the use of movable pins or the like. The dispensing mechanism 122 may also be configured to distinguish between pills P having different sizes. However, once the dispensing mechanism 122 is configured for a particular pill P, the container 150 is preferably utilized for dispensing the particular pill P the container 150 has been configured for.

The sensor(s) 124 are configured to detect whether the dispenser mechanism 122 has a pill P within its recess. Upon detection of a pill P with the recess of the dispenser mechanism 122, the counter 118 increases the count number by one. This enables the pill dispenser 100 to track the number of pills P that have been dispensed. The sensor(s) 124 are communicatively interconnected with the counter 118 and the processor 114. The sensor(s) 124 may be any type of sensor, such as a movement or motion sensor, a proximity sensor, a plunger sensor, a limit switch, etc. Additional sensors may be included in the pill dispenser 100 to detect other occurrences, such as a sensor to detect whether the power source 110 has available power that falls below a predetermined threshold, a sensor to detect whether the cap 160 is secured to the container 150, etc.

The visual indicator(s) 126 are configured to provide a visual indication to remind the user to dispense a pill from the dispenser 100, to indicate the time, to indicate the status of the power source, or the like. The visual indicator(s) 126 emit light to provide the visual indication and are preferably light emitting diodes (LEDs) of any desired color, but may be any type of light. The audible indicator(s) 128 are configured to emit a distinctive audible sound, and may be a speaker that is powered by an amplifier to emit a buzzer, chirp, chime, or the like. Alternatively, the audible indicator 128 may be a speaker that relays audible communication information, such as a recorded message, a relayed communication message, a relayed live transmission, or the like. The physical indicator(s) 130 is configured to produce a physical movement of the dispenser 100, such as a vibration or the like. The transceiver(s) 140 can establish two-way communication between the pill dispenser 100 and a telephone line by way of the antenna 142. The transceiver(s) 140 is configured to transmit and receive signals, and may be configured to communicate via any known radio frequency.

The pill dispenser 100 is configured to logically interconnect wirelessly to a remote computer device via the transceiver and antenna 142, or non-wirelessly to a remote computer device via the input/output port(s) 148. Wireless interconnection may occur via any known technique (e.g., wireless local area network (LAN), IrDA, Bluetooth, FireWire, etc.). Non-wireless interconnection may occur through a network system via any number of switches, such as a LAN, a wide area network (WAN), an intranet, an extranet, the Internet, etc. Any type of a remote computer device may be interconnected with the pill dispenser 100, such as a desk top computer, a laptop computer, personal digital assistant (PDA), a cell phone, a remote control, a pager, etc.

When placed in a LAN networking environment, the pill dispenser 100 connects to the local network through the input/output port(s) 148. When used in a WAN networking environment such as the Internet, the pill dispenser 100 establishes communications over the network using the modem(s) 144. The modem 144 may be internal or external to the pill dispenser 100.

The input/output interface(s) 146 preferably include four keys, buttons, or toggle switches that may be color-coded and/or may include indicia to enable a user to enter a PIN to cause the pill dispenser 100 to dispense a pill P. The pill dispenser 100 may also be configured to operate with input/output interface(s) 146 configured to operate with biometric information as input parameters, such as a finger print, voice, signature, DNA, facial structure, iris, retina, etc. The input/output port(s) 148 are configured to interconnect with remote computer devices using known interconnection techniques, e.g., with a cable or the like.

The pill dispenser 100 is configured to be repeatedly utilized prior to being discarded. Preferably, a pharmacy may configure a pill dispenser 100 for a particular pill P by programming the particular pill dispenser 100 with pill dispenser parameters for the particular pill P. The pill dispenser parameters can include the dosage schedule, the dosage amount, the pill expiration date, the pill refill quantity, the time interval between doses, etc. When the rotary wheel of the dispensing mechanism 122 has been configured for the particular pill P, and the pill dispenser 100 is associated with a certain patient, additional pill dispenser parameters can be provided, such as the patient name, the pharmacist name, the pharmacy name, the pharmacy address, the patient address, etc. When the patient receives the pill dispenser 100, the patient may be required or may choose to configure the pill dispenser 100 with a PIN or other criteria, such as biometric information, to be required to be entered prior to dispensing a pill P. This prevents unauthorized users from obtaining pills, and can also prevent the patient from receiving pills at unauthorized times.

For example, the pill dispenser 100 may be configured to dispense a pill P to a patient A at a predetermined time interval, such as every twelve hours or the like. In the following examples, an 'appropriate time' refers to an arbitrary time within a predetermined time interval before and after a designated dispensing time, for example, sometime during the time thirty minutes before or after twelve o'clock noontime, and an 'inappropriate time' refers to an arbitrary time outside of the time interval designated as an 'appropriate time'.

In a condition where patient A enters an appropriate PIN at an appropriate time, the visual indicator(s) 126, audible indicator(s) 128, and/or the physical indicator(s) 130 emit or produce associated output signals for this combination of occurrences. In this instance if a pill P is contained within the recess of the dispensing mechanism 122, a visual indicator 126 in the form of a solid green or other color light emitting diode (LED) may be illuminated to indicate that time is within the appropriate time range, and entry of an acceptable PIN causes a pill P to be dispensed from the dispenser 100. Alternatively, if a pill P is not contained within the recess of the dispensing mechanism 122 during this instance, no LED may be illuminated and nothing happens.

Simple shaking of the dispenser 100 to cause the green or other color LED to illuminate could be sufficient to overcome this occurrence. Once a pill P is dispensed during this appropriate time range, patient A is then unable to have the dispenser 100 dispense another pill P until a predetermined period before or after the end of the predetermined time interval, e.g., the twelve hour time window, allowing for early retrieval of specified, inconsequential time periods of medications (e.g., if the patient wants to retrieve the medication ±½ hour to a twelve hour dosage period, etc.).

When patient A enters an appropriate PIN at an inappropriate time, then the visual indicator(s) 126, audible indicator(s) 128, and/or the physical indicator(s) 130 emit or produce associated output signals for this combination of occurrences. For example, entry of an appropriate PIN at an inappropriate time may result in nothing happening. Alternatively, entry of an appropriate PIN at an inappropriate time may result in a red or other color LED to blink for a few seconds or the like, or may result in an audible sound to be emitted or a physical movement of the dispenser 100 to provide negative feedback to patient A to indicate that the PIN has been entered at an inappropriate time.

In either case, no pill P is dispensed. Patient A then continues to be unable to have the dispenser 100 dispense another pill P until a predetermined period before or after the end of the predetermined time interval, e.g., the twelve hour time window, allowing for early retrieval of specified, inconsequential time periods of medications (e.g., if the patient wants to retrieve the medication ±½ to a twelve hour dosage period, etc.).

If patient A enters an inappropriate PIN at an any time during the appropriate time period, then the visual indicator(s) 126, audible indicator(s) 128, and/or the physical indicator(s) 130 emit or produce associated output signals for this combination of occurrences. In this instance, if a pill P is contained within the recess of the dispensing mechanism 122, a visual indicator 126 in the form of a solid green or other color light emitting diode (LED) may be illuminated to indicate that time is within the appropriate time range, and entry of an unacceptable PIN causes nothing to happen.

Alternatively, if a pill P is not contained within the recess of the dispensing mechanism 122 during this instance, no LED may be illuminated and nothing happens. Simple shaking of the dispenser 100 to cause the green or other color LED to illuminate could be sufficient to overcome this occurrence. However, subsequent entry of an inappropriate PIN at any time during the appropriate time period may result in a red or other color LED to blink for a few seconds or the like, or may result in an audible sound to be emitted or a physical movement of the dispenser 100 to provide negative feedback to patient A to indicate that an inappropriate PIN has been entered. In either case, no pill P is dispensed. Patient A must enter an appropriate PIN during the appropriate time period to have the dispenser 100 dispense a pill P.

Operation of the pill dispenser 100 begins when the pill dispenser 100 is configured for use with a particular pill P. The pill dispenser 100 enhances patient compliance for following through a particular drug regimen by offsetting negative effects of memory loss and other cognitive dysfunctions, attenuation of special senses, poor eyesight, lack of patient education, etc. The pill dispenser 100 also ensures the safety of those patients who may be mentally ill or at risk of overdose or noncompliance. The pill dispenser 100 reminds users and dispenses pills to authorized individuals at appropriate times, and is economical and convenient. The pill dispenser 100 also reminds users and dispenses pills, capsules, pellets, tablets, or the like having any particular size and shape.

In an alternative embodiment, dispensing container 150 may be divided by a piece of plastic or any other suitable material. Each separate compartment may have its own individualized time schedule with its own dispensing mechanisms 122, or may share the same dispensing mechanism that accesses pills from each compartment. An indicator signals the user to enter their PIN and retrieve the appropriate pill for each particular compartment. While each compartment is independent of each other, but can be synchronized to dispense pills at the same time if a prescription deems it appropriate to do so.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. It is to be understood that the present invention is not limited to the embodiments described above, but encompasses any and all embodiments within the scope of the following claims.

We claim:

1. A portable electronic programmable pill dispenser, comprising:
- a pill compartment adapted for containing a plurality of pills;
- a pill dispensing mechanism located proximate said pill compartment for dispensing a single pill, said pill dispensing mechanism comprising:
  - a rotating wheel having a pill-shaped recess for dispensing the single pill, said rotating wheel rotating about a horizontal axis orthogonal to a vertical axis of said pill dispenser;
  - an upper ramp positioned within said pill dispenser, said upper ramp being angled with respect to the vertical axis;
  - a lower ramp positioned below said upper ramp within said pill dispenser, said lower ramp being angled with respect to the vertical axis, said rotating wheel being positioned between said upper and lower ramps and being further positioned adjacent an inner wall of said pill dispenser, such that the pill to be dispensed travels along said upper ramp to the pill-shaped recess of said rotating wheel, travels along a vertically downward path as said rotating wheel rotates about the horizontal axis, the pill being deposited onto said lower ramp and traveling along said lower ramp to an opening formed through a container wall of said pill dispenser;
- a programming interface connected to said pill dispenser for programming said pill dispenser;
- a removable locking cap attached to and covering access to said pill compartment;
- an input interface disposed on said cap for inputting user authentication information that provides pill-dispensing authentication;
- a real-time clock disposed on said cap for generating time signals used to trigger a user alert about a scheduled time to dispense the pill; and
- an indicator disposed on said cap capable of alerting a user about said scheduled time to dispense a pill and capable of prompting a user to input said user authentication information in order to dispense a pill.

2. The portable electronic programmable pill dispenser of claim 1, wherein said pill-shaped recess is configurable to accept different pill shapes and sizes.

3. The portable electronic programmable pill dispenser of claim 1, further comprising a pill sensor disposed adjacent said pill dispensing mechanism for detecting the presence or absence of a pill in said pill shaped recess of said pill dispensing mechanism.

4. The portable electronic programmable pill dispenser of claim 1, wherein said programming interface is selected from the group consisting of:
- a wireless communication interface, and
- a wired or cabled communication interface.

5. The portable electronic programmable pill dispenser of claim 1, wherein said input interface for entering user authentication information is selected from the group consisting of:
- a least one user operable input key or button;
- a fingerprint reader;
- a voice signature recognition device;
- a signature recognition device;
- a DNA recognition device;
- a facial structure recognition device; and
- an eye feature scanning recognition device.

6. The portable electronic programmable pill dispenser of claim 1, wherein said indicator is selected from the group consisting of:
- a visual indicator capable of visually notifying said user;
- an audible indicator capable of audibly notifying said user; and
- a physical indicator capable of notifying said user by means of mechanical motion.

7. The portable electronic programmable pill dispenser of claim 1, further comprising:
- a power source disposed in said cap;
- a memory connected to said power source;
- a processor connected to said power source;
- a pill dispense circuit connected to said power source;
- a display connected to said power source;
- a pill counter connected to said power source; and
- a communication bus connected to said processor.

8. The portable electronic programmable pill dispenser of claim 7, wherein said input interface, said real-time clock, said indicator, said memory, said processor, said pill dispense circuit, said display, and said pill counter are located on or within said removable locking cap.

9. A method of operating a portable electronic programmable pill dispenser, comprising the steps of:

programming said electronic programmable pill dispenser with pill information and user authentication information;

filling said pill dispenser with pills associated with said pill information;

providing an alert indicator to notify said user about a scheduled time to dispense a pill;

prompting said user to input user authentication information;

determining if said input user authentication information matches said programmed user authentication information;

providing a pill dispensing mechanism located proximate a pill compartment of the pill dispenser for dispensing a single pill, said pill dispensing mechanism comprising:

a rotating wheel having a pill-shaped recess for dispensing the single pill, said rotating wheel rotating about a horizontal axis orthogonal to a vertical axis of said pill dispenser;

an upper ramp positioned within said pill dispenser, said upper ramp being angled with respect to the vertical axis;

a lower ramp positioned below said upper ramp within said pill dispenser, said lower ramp being angled with respect to the vertical axis, said rotating wheel being positioned between said upper and lower ramps and being further positioned adjacent an inner wall of said pill dispenser, such that the pill to be dispensed travels along said upper ramp to the pill-shaped recess of said rotating wheel, travels along a vertically downward path as said rotating wheel rotates about the horizontal axis, the pill being deposited onto said lower ramp and traveling along said lower ramp to an opening formed through a container wall of said pill dispenser;

configuring the pill dispensing mechanism of said electronic programmable pill dispenser for a specific pill shape or pill size; and, dispensing the pill based on said step of determining.

10. A method of programming a portable electronic programmable pill dispenser, comprising the steps of:

programming the electronic programmable pill dispenser with pill dispenser parameters selected from the group consisting of a pill dosage schedule, a pill dosage amount, a pill expiration date, pill refill information, and a time interval between pill doses;

filling said pill dispenser with pills associated with said pill dispenser parameters;

inputting information to said portable electronic programmable pill dispenser selected from the group consisting of a patient name, a patient address, a pharmacist name, a pharmacy name, and a pharmacy address;

inputting user authentication information selected from the group consisting of a personal identification number (PIN), and user specific biometric information;

providing a pill dispensing mechanism located proximate a pill compartment of the pill dispenser for dispensing a single pill, said pill dispensing mechanism comprising:

a rotating wheel having a pill-shaped recess for dispensing the single pill, said rotating wheel rotating about a horizontal axis orthogonal to a vertical axis of said pill dispenser;

an upper ramp positioned within said pill dispenser, said upper ramp being angled with respect to the vertical axis;

a lower ramp positioned below said upper ramp within said pill dispenser, said lower ramp being angled with respect to the vertical axis, said rotating wheel being positioned between said upper and lower ramps and being further positioned adjacent an inner wall of said pill dispenser, such that the pill to be dispensed travels along said upper ramp to the pill-shaped recess of said rotating wheel, travels along a vertically downward path as said rotating wheel rotates about the horizontal axis, the pill being deposited onto said lower ramp and traveling along said lower ramp to an opening formed through a container wall of said pill dispenser; and, configuring the pill dispensing mechanism of said electronic programmable pill dispenser for a specific pill shape or pill size.

11. The method of programming a portable electronic programmable pill dispenser of claim 10, wherein said steps of programming and inputting information to said programmable electronic pill dispenser further include the step of communicating information to and from said pill dispenser via a wireless communication protocol.

12. The method of programming a portable electronic programmable pill dispenser of claim 10, wherein said steps of programming and inputting information to said programmable electronic pill dispenser further include the step of communicating information to and from said pill dispenser via a wire connected communication link.

* * * * *